(12) United States Patent
Qin

(10) Patent No.: US 9,927,946 B2
(45) Date of Patent: Mar. 27, 2018

(54) METHOD AND DEVICE FOR PROGRESS CONTROL

(71) Applicant: Xiaomi Inc., Beijing (CN)

(72) Inventor: Qiuping Qin, Beijing (CN)

(73) Assignee: Xiaomi Inc., Beijing (CN)

( * ) Notice: Subject to any disclaimer, the term of this patent is extended or adjusted under 35 U.S.C. 154(b) by 363 days.

(21) Appl. No.: 14/755,175

(22) Filed: Jun. 30, 2015

(65) Prior Publication Data
US 2015/0301691 A1      Oct. 22, 2015

Related U.S. Application Data

(63) Continuation of application No. PCT/CN2014/076179, filed on Apr. 25, 2014.

(30) Foreign Application Priority Data

May 31, 2013   (CN) .......................... 2013 1 0214891

(51) Int. Cl.
  *G06F 3/048*     (2013.01)
  *G06F 3/0481*    (2013.01)
  (Continued)

(52) U.S. Cl.
  CPC ........ *G06F 3/0481* (2013.01); *G06F 3/04842* (2013.01); *G06F 3/04847* (2013.01); *G11B 27/105* (2013.01); *G11B 27/34* (2013.01)

(58) Field of Classification Search
  None
  See application file for complete search history.

(56) References Cited

U.S. PATENT DOCUMENTS

2008/0080743 A1    4/2008   Schneiderman et al.
2008/0186808 A1    8/2008   Lee
(Continued)

FOREIGN PATENT DOCUMENTS

CN      102257463      11/2011
CN      102426841       4/2012
(Continued)

OTHER PUBLICATIONS

International Search Report of International Application No. PCT/CN2014/076179, dated Jul. 23, 2014, 4 pages.
(Continued)

*Primary Examiner* — Jeffrey A Gaffin
*Assistant Examiner* — Ayesha Huertas Torres
(74) *Attorney, Agent, or Firm* — Finnegan, Henderson, Farabow, Garrett & Dunner LLP

(57) ABSTRACT

A method for use in a terminal device is provided. The method includes: detecting a trigger signal generated from a multilevel progress bar, wherein the multilevel progress bar includes a first progress bar with a first progress slider and a second progress bar with a second progress slider; when the trigger signal is detected from the first progress bar, calculating a first sliding distance of the first progress slider according to a sliding trajectory indicated in the trigger signal; calculating a progress-adjusting value according to the first sliding distance and a first progress-adjusting function of the first progress bar; calculating a second sliding distance of the second progress slider of the second progress bar according to the calculated progress-adjusting value and a second progress-adjusting function of the second progress bar; and controlling sliding of the progress slider of the second progress bar according to the second sliding distance.

20 Claims, 12 Drawing Sheets

(51) Int. Cl.
    *G11B 27/10*     (2006.01)
    *G06F 3/0484*     (2013.01)
    *G11B 27/34*     (2006.01)

(56)           References Cited

U.S. PATENT DOCUMENTS

| | | |
|---|---|---|
| 2009/0282362 A1 | 11/2009 | Matsumoto |
| 2012/0306879 A1 | 12/2012 | Yokoyama |
| 2014/0208254 A1* | 7/2014 | Lin .................... G06F 3/04847 |
| | | 715/772 |

FOREIGN PATENT DOCUMENTS

| | | |
|---|---|---|
| CN | 102609143 | 7/2012 |
| CN | 103021439 | 4/2013 |
| CN | 103279352 | 9/2013 |
| JP | 09-198224 | 7/1997 |
| JP | 2006164033 | 6/2006 |
| JP | 2009230468 | 10/2009 |

OTHER PUBLICATIONS

Extended European Search Report from European Patent Office for Application No. 14804456.3, dated Feb. 15, 2016, 9 pages.
Search Report received from Russian Patent Office for Russian Application No. 2015129669/28, dated Nov. 17, 2016, and English translation thereof, 4 pages.
Office Action received from Patent Office of the Russian Federation for Russian Application No. 2015129669/28, dated Nov. 17, 2016, and English translation thereof, 15 pages.

* cited by examiner

METHOD AND DEVICE FOR PROGRESS CONTROL

CROSS-REFERENCE TO RELATED APPLICATIONS

The present application is a Continuation application of International Application No. PCT/CN2014/076179, filed Apr. 25, 2014, which is based upon and claims priority to Chinese Patent Application No. 201310214891.6, filed May 31, 2013, the entire contents of all of which are incorporated herein by reference.

TECHNICAL FIELD

The present disclosure generally relates to the field of computer technologies and, more particularly, to methods and devices for progress control.

BACKGROUND

With the development of portable terminal devices, such as smart phones, users often use portable terminal devices to browse webpages or watch videos. When a user is browsing a webpage or watching a video, the user may play fast-forward or play backward the webpage or the video as desired.

Conventionally, in many applications, in order to allow a user to control a play progress, a horizontal or vertical progress bar may be provided on a user interface page. The progress bar indicates, e.g., the play progress of a webpage or a video. There may be a button on the progress bar, and a position of the button on the progress bar may indicate the progress of the program. By pressing and dragging the button, or by tapping a position of the progress bar to move the button to that position, the user may control the play progress of the webpage or the video.

SUMMARY

According to a first aspect of the present disclosure, there is provided a method for use in a terminal device, comprising: detecting a trigger signal generated from a multilevel progress bar, wherein the multilevel progress bar includes at least a first progress bar with a first progress slider configured to adjust a progress of the first progress bar, and a second progress bar with a second progress slider configured to adjust a progress of the second progress bar; when the trigger signal is detected from the first progress bar, calculating a first sliding distance of the first progress slider according to a sliding trajectory indicated in the trigger signal; calculating a progress-adjusting value according to the first sliding distance and a first progress-adjusting function of the first progress bar, wherein the first progress-adjusting function represents a relation between the first sliding distance and the progress-adjusting value; calculating a second sliding distance of the second progress slider of the second progress bar according to the calculated progress-adjusting value and a second progress-adjusting function of the second progress bar, wherein the second progress-adjusting function represents a relation between the second sliding distance and the progress-adjusting value; and controlling sliding of the progress slider of the second progress bar according to the second sliding distance.

According to a second aspect of the present disclosure, there is provided a method for controlling a progress of an application, comprising: detecting a trigger signal generated from a multilevel progress bar, wherein the multilevel progress bar includes at least two progress bars, and each of the at least two progress bars includes at least one progress slider configured to adjust a progress of the corresponding progress bar; when the trigger signal is detected from one of the at least two progress bars of the multilevel progress bar, calculating a sliding distance of the corresponding progress slider of the one of the at least two progress bars according to a sliding trajectory indicated in the trigger signal; calculating a progress-adjusting value according to the sliding distance and a progress-adjusting function of the one of the at least two progress bars, wherein the progress-adjusting function represents a relation between the sliding distance and the progress-adjusting value; and controlling the progress of the application according to the progress-adjusting value.

According to a third aspect of the present disclosure, there is provided a device, comprising: a processor; and a memory for storing instructions executable by the processor. The processor is configured to perform: detecting a trigger signal generated from a multilevel progress bar, wherein the multilevel progress bar includes at least a first progress bar with a first progress slider configured to adjust a progress of the first progress bar, and a second progress bar with a second progress slider configured to adjust a progress of the second progress bar; when the trigger signal is detected from the first progress bar, calculating a first sliding distance of the first progress slider according to a sliding trajectory indicated in the trigger signal; calculating a progress-adjusting value according to the first sliding distance and a first progress-adjusting function of the first progress bar, wherein the first progress-adjusting function represents a relation between the first sliding distance and the progress-adjusting value; calculating a second sliding distance of the second progress slider of the second progress bar according to the calculated progress-adjusting value and a second progress-adjusting function of the second progress bar, wherein the second progress-adjusting function represents a relation between the second sliding distance and the progress-adjusting value; and controlling sliding of the progress slider of the second progress bar according to the second sliding distance.

According to a fourth aspect of the present disclosure, there is provided a device, comprising: a processor; and a memory for storing instructions executable by the processor. The processor is configured to perform: detecting a trigger signal generated from a multilevel progress bar, wherein the multilevel progress bar includes at least two progress bars, and each of the at least two progress bars includes at least one progress slider configured to adjust a progress of the corresponding progress bar; when the trigger signal is detected from one of the at least two progress bars of the multilevel progress bar, calculating a sliding distance of the at least one progress slider of the one of the at least two progress bar according to a sliding trajectory indicated in the trigger signal; calculating a progress-adjusting value according to the sliding distance and a progress-adjusting function of the one of the at least two progress bars, wherein the progress-adjusting function represents a relation between the sliding distance and the progress-adjusting value; and controlling a progress of an application according to the progress-adjusting value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

In the present disclosure, a terminal device may be a smart phone, a tablet computer, an e-book reader, an MP3 (Moving Picture Experts Group Audio Layer III) player, an MP4 (Moving Picture Experts Group Audio Layer IV) player, a laptop computer, a desktop computer, and the like.

The present disclosure provides a multilevel progress bar for progress control, for example, for controlling a play progress of a video, or for controlling a play progress of a webpage, and so on. For example, the multilevel progress bar may include at least two levels of progress bars, each of which may include a progress slider. The progress slider is configured to adjust a progress of a corresponding progress bar. The at least two levels of progress bars may correspond to different progress-adjusting functions, each of the progress-adjusting functions being a function representing a relation between a sliding distance of the progress slider and a progress-adjusting value. The at least two levels of the progress bars may move coordinately based on respective progress-adjusting values and corresponding progress-adjusting functions.

Figure 1:
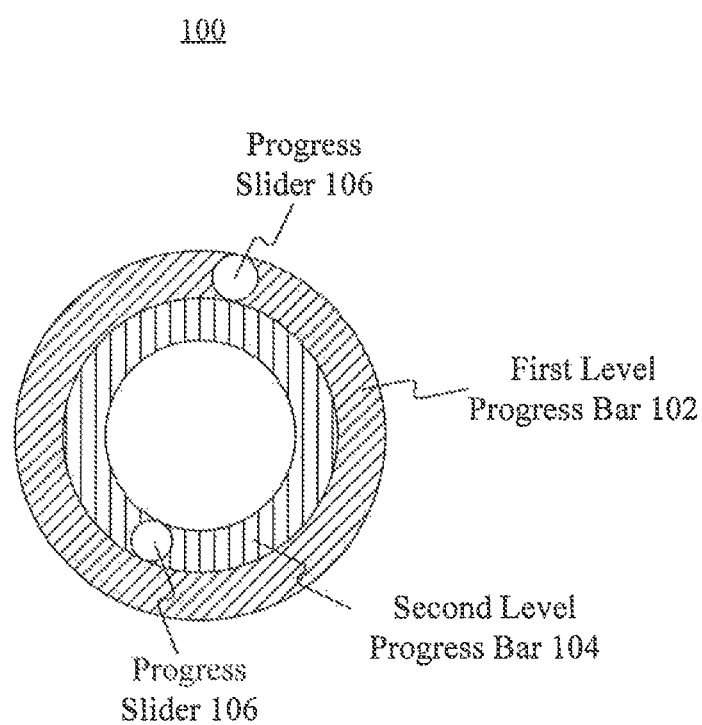
FIG. 1 is a diagram of an interface of a multilevel circular progress bar, according to an exemplary embodiment.

FIG. 1 is a diagram of an interface of a multilevel circular progress bar 100, according to an exemplary embodiment. For example, as shown in FIG. 1, the multilevel progress bar 100 is a multilevel circular progress bar, including two levels of progress bars. The outer ring corresponding to a first level progress bar 102 for a rough adjustment of a play progress, and the inner ring corresponds to a second level progress bar 104 for a fine adjustment of the progress. In one embodiment, each level of the progress bar includes a progress slider 106 thereon, and the position of the progress slider 106 indicates the progress of the current application. The progress may be adjusted by dragging the progress slider 106.

Figure 2:
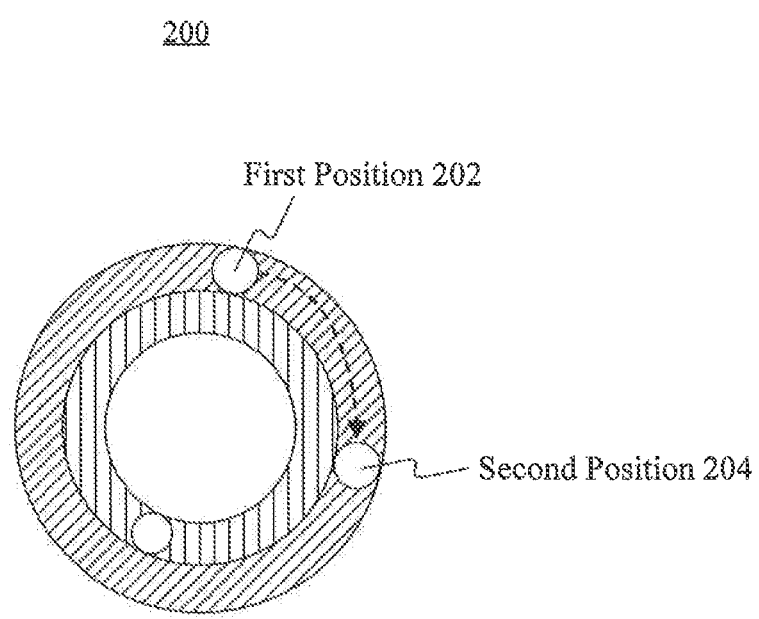
FIG. 2 is a diagram of an interface of a multilevel circular progress bar, according to an exemplary embodiment.

FIG. 2 is a diagram of an interface of a multilevel circular progress bar 200, according to an exemplary embodiment. In the present embodiment, as shown in FIG. 2, the progress slider of the first level progress bar is dragged from a first position 202 to a second position 204. Accordingly, a corresponding progress advances fast-forward from a progress corresponding to the first position 202 to a progress corresponding to the second position 204.

The two levels of progress bars move in a coordinated manner, e.g., when moving of the progress slider on one of the progress bars is triggered, the progress slider on the other progress bar may move accordingly. The coordinated movement relationship is related to a respective progress-adjusting function corresponding to each level of progress bar.

For example, assuming that a total play time of a video file is 120 minutes, one complete trip around the first level progress bar corresponds to 120 minutes, and one complete trip around the second level progress bar corresponds to 5 minutes. Accordingly, in this example, the progress-adjusting function of the first level progress bar is:

$$120*\Delta x/(2*\pi), \quad\quad\quad 1)$$

where $\Delta x$ is a rotation angle of the progress slider of the first level progress bar, and the progress-adjusting function of the second level of progress bar is:

$$5*\Delta y/(2*\pi), \quad\quad\quad 2)$$

where $\Delta y$ is a rotation angle of the progress slider of the second level progress bar. In this example, when sliding of the progress slider of the first level progress bar is triggered, if the sliding angle corresponding to the first level progress slider is $\Delta a$, then the progress-adjusting value is obtained as $120*\Delta a/(2*\pi)$ by substituting $\Delta a$ into equation 1). The sliding angle of the progress slider the second level progress bar is calculated as $\Delta y=24*\Delta a$ according to the progress-adjusting value and equation 2). Thus, the progress slider of the second level progress bar slides according to this angle.

In the exemplary embodiment, the number of the progress sliders on each level of progress bar is not limited. For example, two progress sliders may be present on the same level in a progress bar, in which the first slider allows fast-forward playing of the video, and the second slider allows backward playing of the video.

Figure 3:
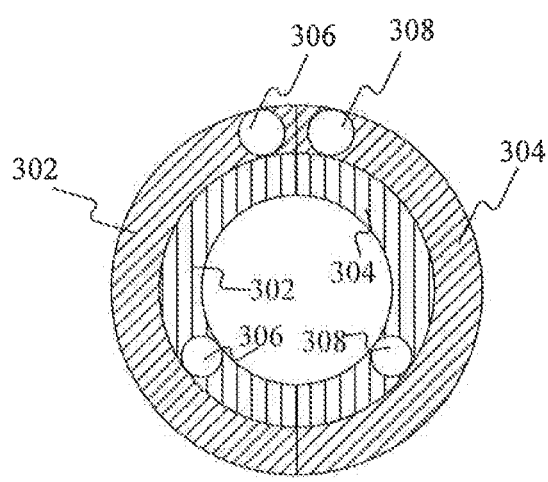
FIG. 3 is a diagram of an interface of a multilevel circular progress bar, according to an exemplary embodiment.

FIG. 3 is a diagram of an interface of a multilevel circular progress bar 300, according to an exemplary embodiment. As shown in FIG. 3, the circular progress bar 300 includes semi-closed progress bars, with the outer ring corresponding to the first level progress bar and the inner ring corresponding to the second level progress bar. Each of the outer ring is divided into a left segment 302 and a right segment 304. Each left segment 302 includes a progress slider 306, and each right segment 304 includes a progress slider 308. When the progress slider 306 of the left segment 302 slides from top to bottom along a circular trajectory of the left segment 302, the play progress is controlled to be fast-forward. When the progress slider 308 of the right segment 304 slides from top to bottom along a circular trajectory of the right segment 304, the play progress is controlled to be backward. When the progress slider 306 of the left segment 302 is initially at the bottom of the ring, and slides from bottom to top along the circular trajectory of the left segment 302, the play progress is controlled to be backward. When the progress slider 308 of the right segment is initially at the bottom of the ring, and slides from bottom to top along the circular trajectory of the right segment 304, the play progress is controlled to be fast-forward.

As can be seen from the above example, each progress bar of the multilevel progress bar is associated with an independent progress-adjusting function. The progress-adjusting function is a function representing a relation between a sliding distance of the progress slider and a progress-adjusting value. When a progress slider on one of the progress bars slides to change a progress, a corresponding progress-adjusting value may be calculated according to a progress-adjusting function of the triggered progress bar. Further, the sliding distance of each progress slider may be determined according to the calculated progress-adjusting value and the progress-adjusting function of a different progress bar, resulting in coordinated movement of each level of progress bars.

In one embodiment, the relation between the sliding distance of the progress slider and the progress-adjusting value may be linear. That is, the sliding distance is adjusted in proportion to the progress-adjusting value.

In some embodiments, the multilevel progress bar may include a closed multilevel progress bar or a non-closed multilevel progress bar. The closed multilevel progress bar refers to a progress bar with a loop structure in which there is no starting point and finishing point. The non-closed multilevel progress bar refers to a progress bar in which there is a starting point and a finishing point.

In some embodiments, the closed multilevel progress bar includes but not limited to: a multilevel circular progress bar, a multilevel rectangular progress bar, a multilevel triangular progress bar, and the like. The multilevel circular progress bar is a multilevel progress bar in which each progress bar is of a circular structure. The multilevel rectangular progress bar is a multilevel progress bar in which each progress bar is of a rectangular structure. The multilevel triangular progress bar is a multilevel progress bar in which each progress bar is of a triangular structure. Since the closed multilevel progress bar allows the progress slider to move cyclically within the progress bar, such progress bar may be used in a screen of a limited size to enable a recursive adjustment so as to achieve a larger moving distance.

In some implementations, when the multilevel progress bar includes a closed multilevel progress bar, each level of closed multilevel progress bar may correspond to a progress less than or equal to a total progress. For example, when the multilevel progress bar is a circular progress bar as shown in FIG. 1, the first level progress bar may correspond to a play progress of the total play progress of an entire application. For example, if the application is a video file with a total play time of 120 minutes, one complete trip around the first level progress bar corresponds to 120 minutes of play time, and one complete trip around the second level progress bar corresponds to 5 minutes of play time. Thus one complete trip around the first level progress bar equals to twenty four complete trips around the second level progress bar. In some implementations, the first level progress bar may also correspond to a part of the play progress of the entire application. For example, one complete trip around the first level progress bar may correspond to 60 minutes of play time, and thus completion of the entire video requires two complete trips around the first level progress bar.

In some embodiments, the non-closed multilevel progress bar includes but not limited to: a multilevel stripe progress bar, a multilevel curved progress bar, and the like.

In some embodiments, a progress adjustment performed by the progress slider on a corresponding progress bar includes but not limited to: a continuous adjustment, a discrete adjustment, and the like. The discrete adjustment refers to the progress slider moving step by step according to preset progress steps, rather than moving continuously on the progress bar. For example, each of the first level progress bar and the second level progress bar may consist often progress steps, and each time the second level progress bar moves ten progress steps, the first level progress bar moves one progress step.

By providing a multilevel progress bar with at least two levels of progress bars and corresponding progress-adjusting functions, a user may select different levels of progress bars to adjust the progress as desired for a fine adjustment of the progress, and inadvertent operations or inaccurate positioning of the play progress may be reduced.

Figure 4:
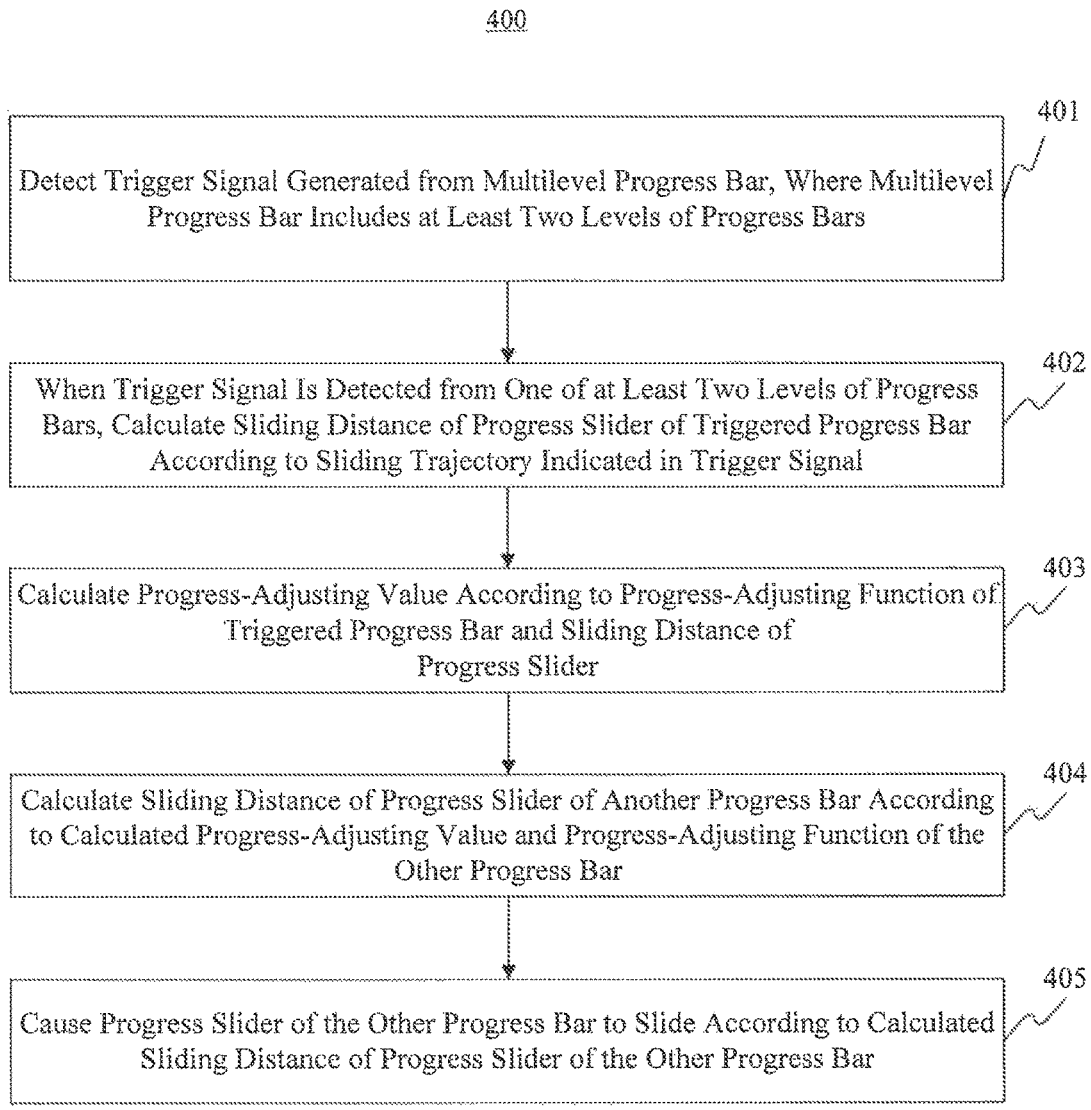
FIG. 4 is a flowchart of a method for progress control, according to an exemplary embodiment.

FIG. 4 is a flowchart of a method 400 for progress control, according to an exemplary embodiment. The method 400 may be performed by a terminal device. Referring to FIG. 4, the method 400 includes the following steps.

In step 401, the terminal device detects a trigger signal generated from a multilevel progress bar, e.g., when a user performs an operation on the multilevel progress bar. The multilevel progress bar includes at least two levels of progress bars, each of which includes at least one progress slider thereon. The progress slider is configured to adjust a progress of a corresponding progress bar, and each level of the progress bars may correspond to a different progress-adjusting function, where the progress-adjusting function is a function representing a relation between a sliding distance of the progress slider and a progress-adjusting value. The levels of the progress bars move in a coordinated manner based on respective progress-adjusting values and corresponding progress-adjusting functions. The trigger signal indicates information on the triggered progress bar and a sliding trajectory of the progress slider of the triggered progress bar.

In step 402, when the trigger signal is detected from one of the at least two levels of progress bars, referred to hereafter as the triggered progress bar, the terminal device calculates a sliding distance of the progress slider of the triggered progress bar according to a sliding trajectory indicated in the trigger signal.

In step 403, the terminal device calculates a progress-adjusting value according to a progress-adjusting function of the triggered progress bar and the sliding distance of the progress slider.

In step 404, the terminal device calculates a sliding distance of a progress slider of another progress bar according to the calculated progress-adjusting value and a progress-adjusting function of the other progress bar.

In step 405, the terminal device causes the progress slider of the other progress bar to slide according to the sliding distance of the progress slider of the other progress bar.

For example, as shown in FIG. 1, the multilevel progress bar is a multilevel circular progress bar, including two levels of progress bars. The outer ring is a first level progress bar for achieving a rough adjustment of a play progress, and the inner ring is a second level progress bar for achieving a fine adjustment of the progress. In one embodiment, each level of the progress bars includes a progress slider thereon, and the position of the progress slider indicates the progress of the current application. The progress may be adjusted by dragging the progress slider. As shown in FIG. 2, if the progress slider of the first level progress bar is dragged from a first position to a second position, the progress accordingly advances fast-forward from a progression corresponding to the first position to a progression corresponding to the second position. The two levels of progress bars move in a coordinated manner, e.g., when moving of the progress slider on one of the progress bars is triggered, the progress slider on the other one of the progress bars is controlled to move accordingly. The coordinated movement relationship is related to respective progress-adjusting function corresponding to each level of progress bar.

In the present disclosure, the number of the progress sliders on each level of progress bars is not limited. For example, two progress sliders may be included, in which the first slider enables fast-forward playing of the progress, and the second slider enables backward playing of the progress. Also for example, as shown in FIG. 3, the circular progress bar is a semi-closed progress bar, the outer ring is the first level progress bar and the inner ring is the second level progress bar. Each of the outer ring and the inner ring is divided into a left segment and a right segment, and the left segment and the right segment each includes a corresponding progress slider. When the progress slider of the left segment slides from top to bottom along a circular trajectory of the left segment, the play progress is controlled to be fast-forward. When the progress slider of the right segment slides from top to bottom along a circular trajectory of the right segment, the play progress is controlled to be backward. When the progress slider of the left segment is at the bottom of the ring, and slides from bottom to top along the circular trajectory of the left segment, the play progress is controlled to be backward. When the progress slider of the right segment is at the bottom of the ring, and slides from bottom to top along the circular trajectory of the right segment, the play progress is controlled to be fast-forward.

In one embodiment, the relation between the sliding distance of the progress slider and the progress-adjusting value is linear.

The multilevel progress bar can be a closed multilevel progress bar or a non-closed multilevel progress bar.

In some embodiments, the closed multilevel progress bar includes but not limited to: a multilevel circular progress bar, a multilevel rectangular progress bar, a multilevel triangular progress bar, and the like.

In some embodiments, the non-closed multilevel progress bar includes a multilevel stripe progress bar, a multilevel curved progress bar, and the like.

In some embodiments, a progress adjustment performed by the progress slider on a corresponding progress bar in the multilevel progress bar includes a continuous adjustment, a discrete adjustment, and the like.

By including at least two levels of progress bars in a multilevel progress bar, and each level of progress bar corresponding to a different progress-adjusting function, a user may select different levels of progress bars to perform a fine adjustment of the progress, thereby reducing inadvertent operations or inaccurate positioning of the progress bar.

Figure 5:
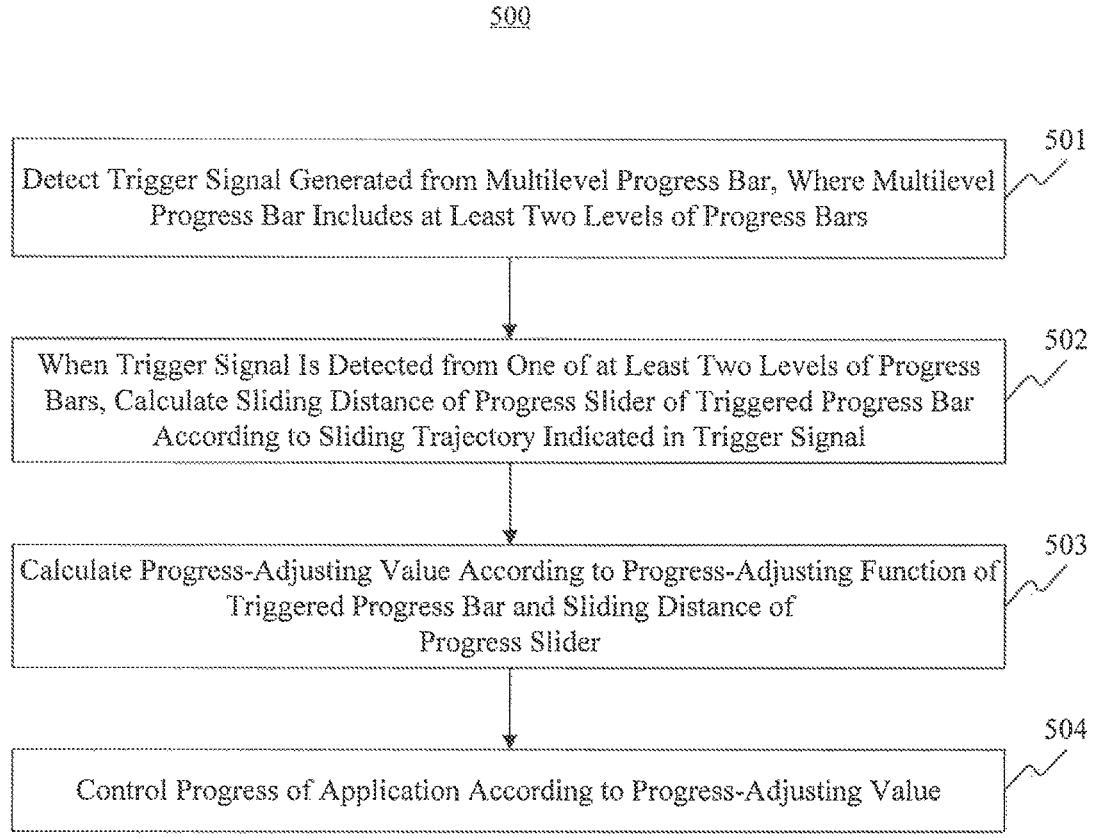
FIG. 5 is a flowchart of a method for progress control, according to an exemplary embodiment.

FIG. 5 is a flowchart of a method 500 for progress control, according to an exemplary embodiment. The method 500 may be performed by a terminal device. Referring to FIG. 5, the method 500 includes the following steps.

In step 501, the terminal device detects a trigger signal generated from a multilevel progress bar, e.g., when a user performs an operation on the multilevel progress bar. The multilevel progress bar includes at least two levels of progress bars, each of which includes at least one progress slider thereon. The progress slider is configured to adjust a progress of a corresponding progress bar. Each level of the progress bars may correspond to a different progress-adjusting function, and each of the progress-adjusting functions is a function representing a relation between a sliding distance of the progress slider and a progress-adjusting value. The levels of the progress bars move in a coordinated manner based on respective progress-adjusting values and corresponding progress-adjusting functions. The trigger signal indicates information on the triggered progress bar and a sliding trajectory of the progress slider of the triggered progress bar.

In step 502, when the trigger signal is detected from one of the at least two levels of progress bars, referred to hereafter as the triggered progress bar, the terminal device calculates a sliding distance of the progress slider of the triggered progress bar according to a sliding trajectory indicated in the trigger signal.

In step 503, the terminal device calculates a progress-adjusting value according to a progress-adjusting function of the triggered progress bar and the sliding distance of the progress slider.

In step 504, the terminal device controls the progress of an application according to the progress-adjusting value.

Figure 6:
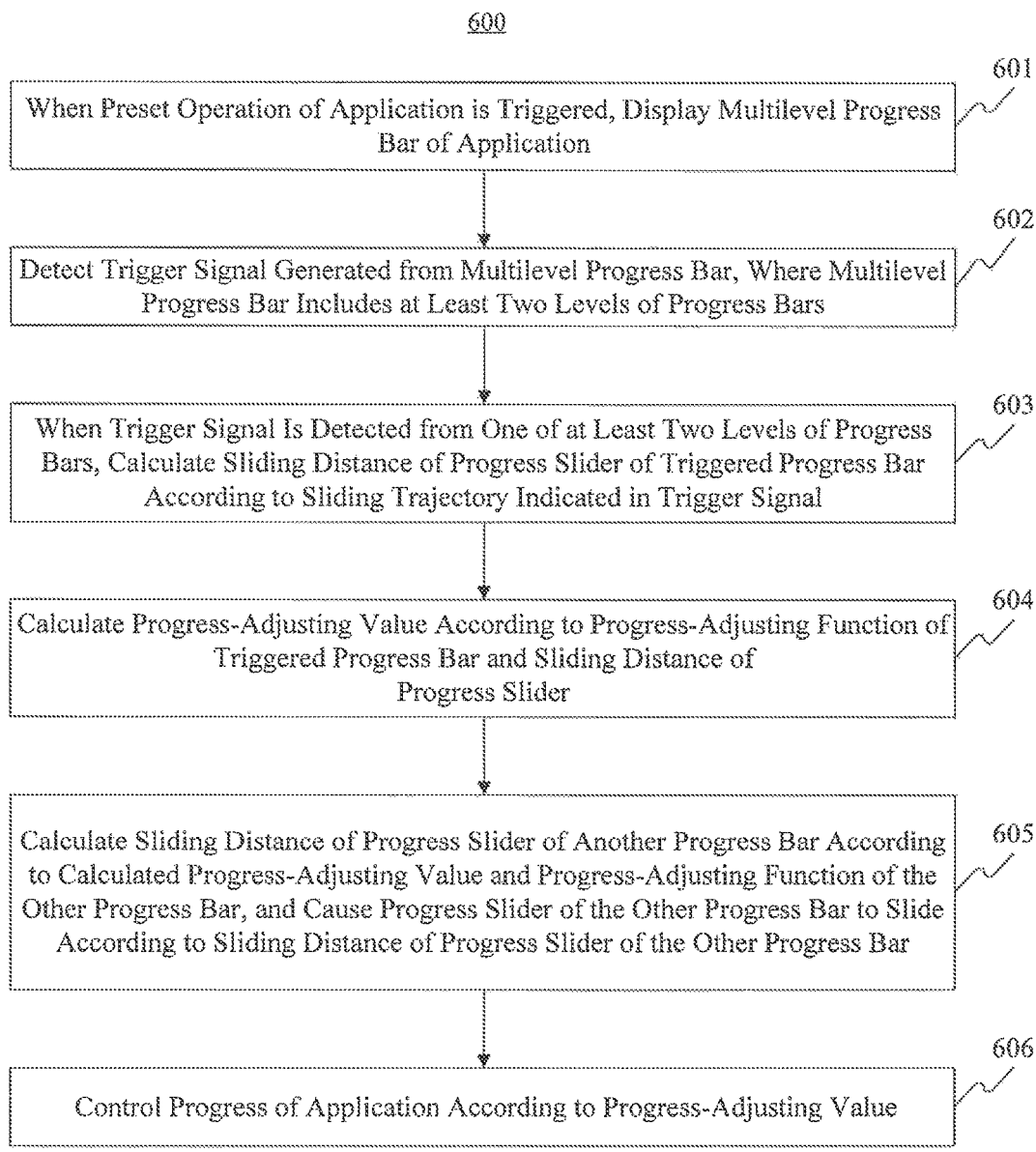
FIG. 6 is a flowchart of a method for progress control, according to an exemplary embodiment.

FIG. 6 is a flowchart of a method 600 for control of a multilevel progress bar, according to an exemplary embodiment. The method 600 may be performed by a terminal device. Referring to FIG. 6, the method 600 includes the following steps.

In step 601, when a preset operation of an application is triggered, the terminal device causes a multilevel progress bar of the application to be displayed.

In the present disclosure, the application includes but not limited to: a browser, video player software, and the like. The preset operation includes but not limited to: an operation of starting of the application or an operation of triggering a functional module in the application. For example, if a video link is triggered in a video player, the terminal device may load the file of the video, and display a multilevel progress bar in the playing interface.

Similar to the above described, the multilevel progress bar in the method 600 includes at least two levels of progress bars, each of which includes at least a progress slider thereon.

In some implementations, various types of progress bars may be used such that a user may select and change different types of progress bars based on the user's preference. In some implementations, a hiding function may be provided for the multilevel progress bar. When the multilevel progress bar is needed, displaying of the multilevel progress bar may be triggered, and when the multilevel progress bar is not needed, the multilevel progress bar may be hidden. Moreover, in order to facilitate control of the multilevel progress bar by a user, a zoom-in and a zoom-out function may be provided for the multilevel progress bar to allow the user to adjust the multilevel progress bar.

In step 602, the terminal device detects a trigger signal generated from the multilevel progress bar, e.g., when a user performs an operation on the multilevel progress bar.

In some embodiments, the trigger signal includes a signal generated from a progress slider of one level of progress bar or a signal generated from any point on one level of progress bar. As shown in FIG. 2, the trigger signal may be a signal of sliding the progress slider on the first level progress bar from the first position to the second position by a user, or may be a trigger signal when the user taps the second position on the first level progress bar. The trigger signal indicates information on the triggered progress bar and a sliding trajectory of the progress slider of the progress bar.

In step 603, when the trigger signal is detected upon one of the at least two levels of progress bars, referred to hereafter as the triggered progress bar, the terminal device calculates a sliding distance of the progress slider of the triggered progress bar according to the sliding trajectory in the trigger signal.

For example, after the trigger signal upon the first level progress bar as shown in FIG. 1 is detected, the sliding distance of the progress slider of the triggered progress bar may be calculated according to the starting point and the finishing point of the sliding trajectory of the progress slider on the triggered progress bar. Calculation methods known in the related arts may be used for calculation of the sliding distance.

In step 604, the terminal device calculates a progress-adjusting value according to a progress-adjusting function of the triggered progress bar and the sliding distance of the progress slider.

In some embodiments, various types of multilevel progress bars may be stored in advance in application software. Thus, a user may change a current multilevel progress bar of the application according to the user's preference. For example, the user may replace the current circular progress bar with a triangular progress bar. Therefore, in some implementations, when the progress-adjusting value is calculated, the terminal device may determine the type of the current multilevel progress bar, and acquire the progress-adjusting function of each progress bar according to the corresponding type of the multilevel progress bar. Subsequently, the terminal device may calculate the progress-adjusting value according to the sliding distance of the progress slider and the corresponding progress-adjusting function of the triggered progress bar.

In step 605, the terminal device calculates a sliding distance of a progress slider of another progress bar according to the calculated progress-adjusting value and a progress-adjusting function of the other progress bar, and cause the progress slider of the corresponding progress bar to slide according to the sliding distance of the progress slider of the other progress bar.

In some embodiments, multi-levels of progress bars move coordinately. When a progress slider of one level of progress bar is triggered, other progress slider(s) may be controlled to slide accordingly. For example, the sliding distance of the progress slider of the other progress bar may be calculated according to the calculated progress-adjusting value and the progress-adjusting function of the other progress bar. The sliding trajectory of the other progress bar may be determined according to the sliding distance of the progress slider of the other progress bar, and then the progress slider may be controlled to slide according to the corresponding sliding trajectory. As shown in FIG. 2, when it is detected that the progress slider of the first level progress bar slides from the first position to the second position, the sliding distance of the progress slider of the first level of progress bar may be acquired. The progress-adjusting value may be calculated according to the sliding distance and the progress-adjusting function of the first level progress bar. The sliding distance of the progress slider of the second level progress bar may be calculated according to the progress-adjusting value and the progress-adjusting function of the second level progress bar. The sliding trajectory of the slider on the second level progress bar may be determined according to the sliding distance of the second level of progress bar, and the progress slider of the second level of progress bar may be controlled to slide according to the sliding trajectory. A progress adjustment performed by the progress slider on a corresponding progress bar in the multilevel progress bar may be a continuous adjustment or a discrete adjustment.

In step 606, the terminal device controls the progress of the application according to the progress-adjusting value.

Figure 7:
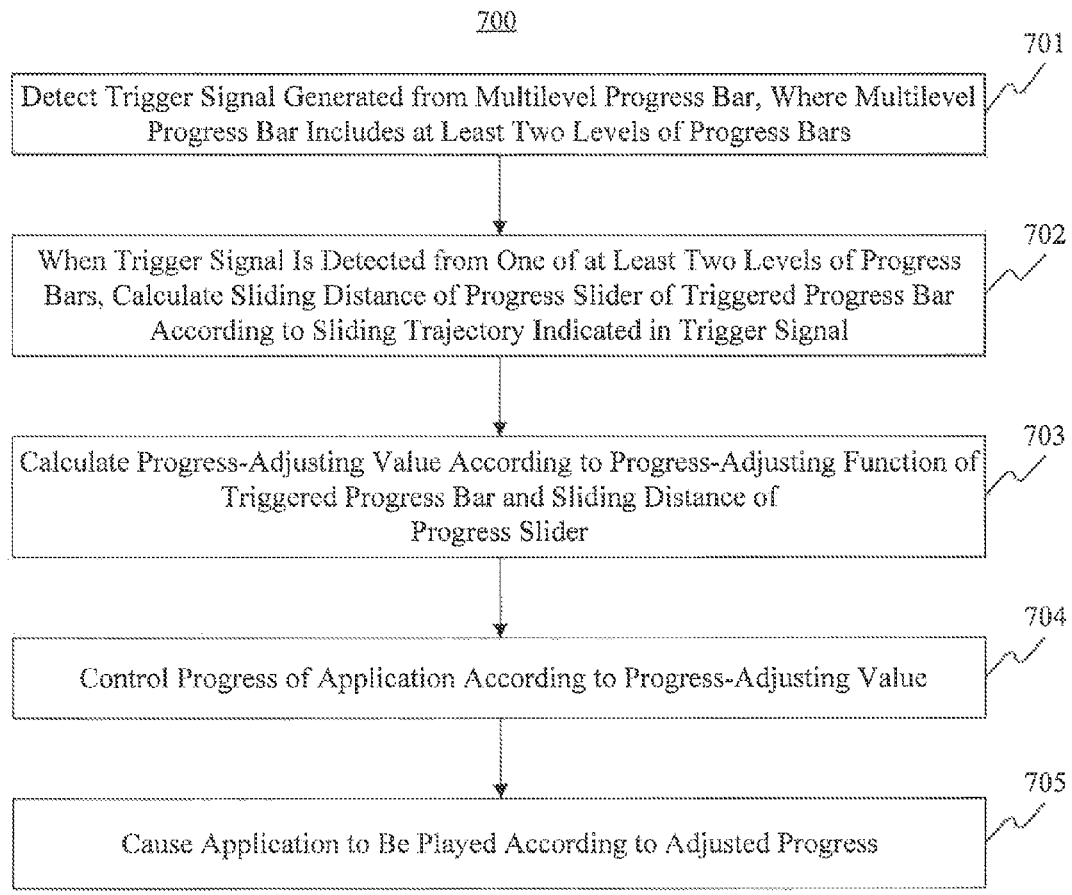
FIG. 7 is a flowchart of a method for progress control, according to an exemplary embodiment.

FIG. 7 is a flowchart of a method 700 for progress control via a multilevel progress bar, according to an exemplary embodiment. The method 700 may be performed by a terminal device. Referring to FIG. 7, the method 700 includes the following steps.

In step 701, the terminal device detects a trigger signal generated from a multilevel progress bar. For example, the terminal device may detect the trigger signal generated from the multilevel progress bar in execution of application software, such as in the process of displaying a webpage or playing a video. The trigger signal includes a signal generated from a progress slider of one level of progress bar, or a signal generated from any point on one level of progress bar. The trigger signal indicates information on the triggered progress bar and a sliding trajectory of the progress slider of the progress bar.

Similar to the above described, the multilevel progress bar in the present embodiment includes at least two levels of progress bars, each of which includes at least one progress slider thereon, the progress slider being configured to adjust a progress of a corresponding progress bar.

In step 702, when the trigger signal is detected from one of the at least two levels of progress bars is detected, referred to hereafter as the triggered progress bar, the terminal device calculates a sliding distance of the progress slider of the triggered progress bar according to the sliding trajectory indicated in the trigger signal.

After the trigger signal is detected from any progress bar of the multilevel progress bar, for example, after the trigger signal is detected from the first level progress bar as shown in FIG. 1, a sliding distance of the progress slider of the triggered progress bar is calculated according to the starting point and the finishing point of the sliding trajectory of the progress slider of the progress bar. Calculation methods known in the related arts may be used in the calculation of the sliding distance.

In step 703, the terminal device calculates a progress-adjusting value according to the sliding distance of the progress slider of the triggered progress bar and the corresponding progress-adjusting function of the triggered progress bar.

In some embodiments, various types of multilevel progress bars may be stored in advance in application software. Thus, a user may change a current multilevel progress bar of the application according to his or her preference. For example, the user may replace the current circular progress bar with a triangular progress bar. Therefore, when the progress-adjusting value is calculated, the terminal device may determine the type of the current multilevel progress bar and acquire the progress-adjusting function of each progress bar according to the corresponding type. Subsequently, the progress-adjusting value may be calculated according to the sliding distance of the progress slider and the corresponding progress-adjusting function of the triggered progress bar.

In step 704, the terminal device controls the progress of the application according to the progress-adjusting value.

For example, if the adjusting value for the playing of the video is five minutes, a video stream of five minutes later is drawn from the video as the current play progress. Methods known in the related arts may be used for adjusting the play progress according to the adjusting value.

In step 705, the terminal device causes the application to be played according to the adjusted progress.

Figure 8:
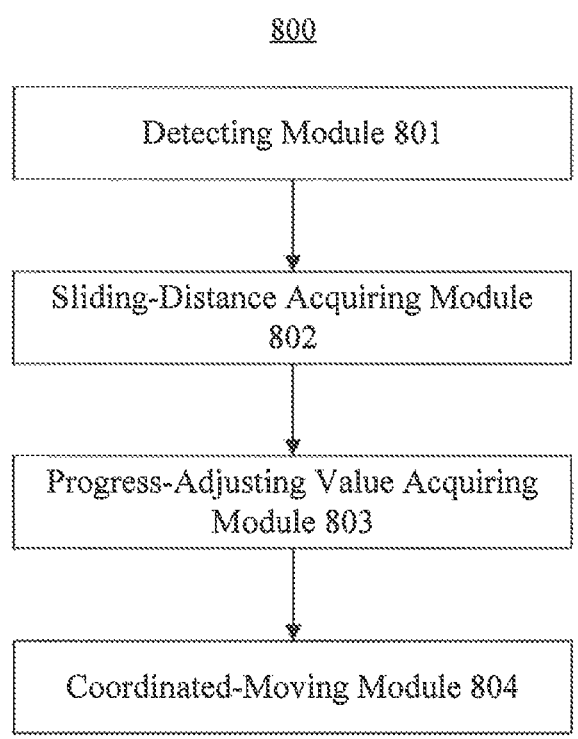
FIG. 8 is a block diagram of a device for progress control, according to an exemplary embodiment.

FIG. 8 is a block diagram of a device 800 for progress control, according to an exemplary embodiment. Referring to FIG. 8, the device 800 includes a detecting module 801, a sliding-distance acquiring module 802, a progress-adjusting value acquiring module 803, and a coordinated-moving module 804.

The detecting module 801 is configured to detect a trigger signal generated from the multilevel progress bar. The multilevel progress bar includes at least two levels of progress bars, each of which includes at least one progress slider thereon, and the progress slider is configured to adjust a progress of a corresponding progress bar.

The sliding-distance acquiring module 802 is configured to, when the trigger signal is detected from one of the at least two levels of progress bars, calculate a sliding distance of the progress slider of the triggered progress bar according to the sliding trajectory in the trigger signal.

The progress-adjusting value acquiring module 803 is configured to calculate a progress-adjusting value according to the progress-adjusting function of the triggered progress bar and the sliding distance of the progress slider.

The sliding-distance acquiring module 802 is further configured to calculate a sliding distance of a progress slider of another progress bar according to the calculated progress-adjusting value and a progress-adjusting function of the other progress bar.

The coordinated-moving module 804 is configured to cause the progress slider of the other progress bar to slide according to the sliding distance of the progress slider of the other progress bar.

Figure 9:
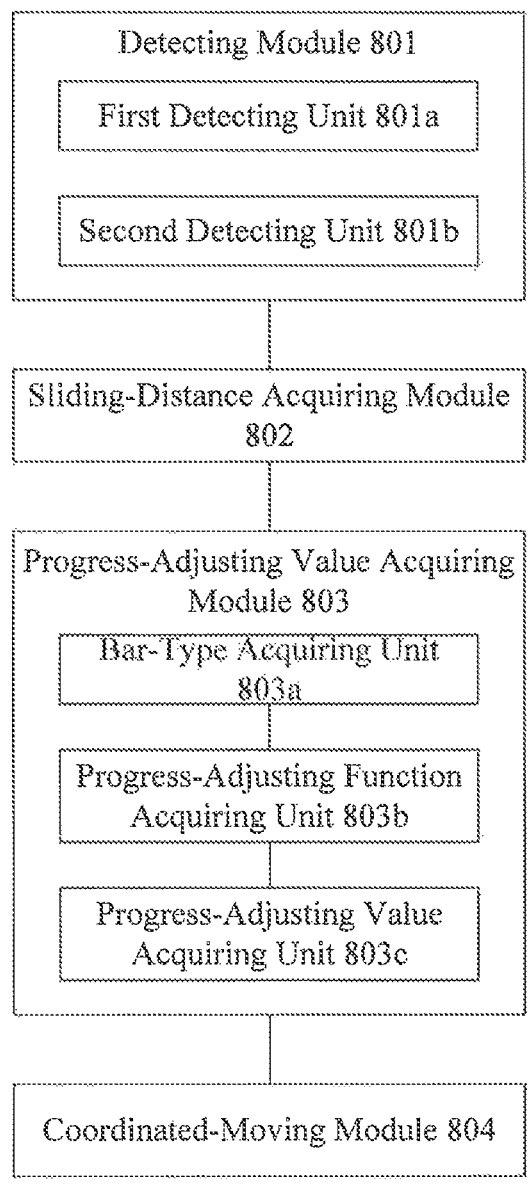
FIG. 9 is a block diagram of a device for progress control, according to an exemplary embodiment.

FIG. 9 is a block diagram of a device 900 for progress control, according to an exemplary embodiment. Referring to FIG. 9, the device 900 includes the detecting module 801, the sliding-distance acquiring module 802, the progress-adjusting value acquiring module 803, and the coordinated moving module 804 (FIG. 8). As shown in FIG. 9, the detecting module 801 further includes a first detecting unit 801a and a second detecting unit 801b.

The first detecting unit 801a is configured to detect a trigger signal generated from a progress slider of any level of the progress bars.

The second detecting unit 801b is configured to detect a trigger signal generated from a point on any level of the progress bars.

Referring to FIG. 9, the progress-adjusting value acquiring module 803 includes a bar-type acquiring unit 803a, a progress-adjusting function acquiring unit 803b, and a progress-adjusting value acquiring unit 803c.

The bar-type acquiring unit 803a is configured to determine a type of the multilevel progress bar.

The progress-adjusting function acquiring unit 803b is configured to acquire a progress-adjusting function of each level of progress bars according to the type of the multilevel progress bar.

The progress-adjusting value acquiring unit 803c is configured to calculate the progress-adjusting value according to the progress-adjusting function of the triggered progress bar and the sliding distance of the progress slider.

In some embodiments, the relation between the sliding distance of the progress slider and the progress-adjusting value is linear.

In some embodiments, a progress adjustment performed by the progress slider on a corresponding progress bar in the multilevel progress bar comprises a continuous adjustment or a discrete adjustment.

In some embodiments, the multilevel progress bar includes a multilevel circular progress bar, a multilevel rectangular progress bar, or a multilevel triangular progress bar.

Figure 10:
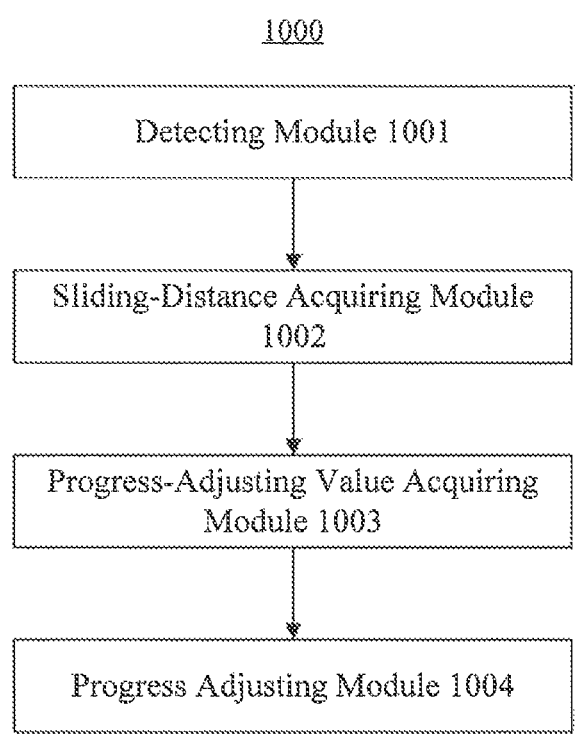
FIG. 10 is a block diagram of a device for progress control, according to an exemplary embodiment.

FIG. 10 is a block diagram of a device 1000 for progress control via a multilevel progress bar, according to an exemplary embodiment. Referring to FIG. 10, the device 1000 includes a detecting module 1001, a sliding-distance acquiring module 1002, a progress-adjusting value acquiring module 1003, and a progress adjusting module 1004.

The detecting module 1001 is configured to detect a trigger signal generated from the multilevel progress bar. The multilevel progress bar includes at least two levels of progress bars, each of which includes at least one progress slider thereon, the progress slider being configured to adjust a progress of a corresponding progress bar.

The sliding-distance acquiring module 1002 is configured to, when the trigger signal is detected from one of the at least two levels of progress bars, calculate a sliding distance of the progress slider of the triggered progress bar according to the sliding trajectory in the trigger signal.

The progress-adjusting value acquiring module 1003 is configured to calculate a progress-adjusting value according to a progress-adjusting function of the triggered progress bar and the sliding distance of the progress slider.

The progress adjusting module 1004 is configured to control the progress of an application according to the progress-adjusting value.

Figure 11:
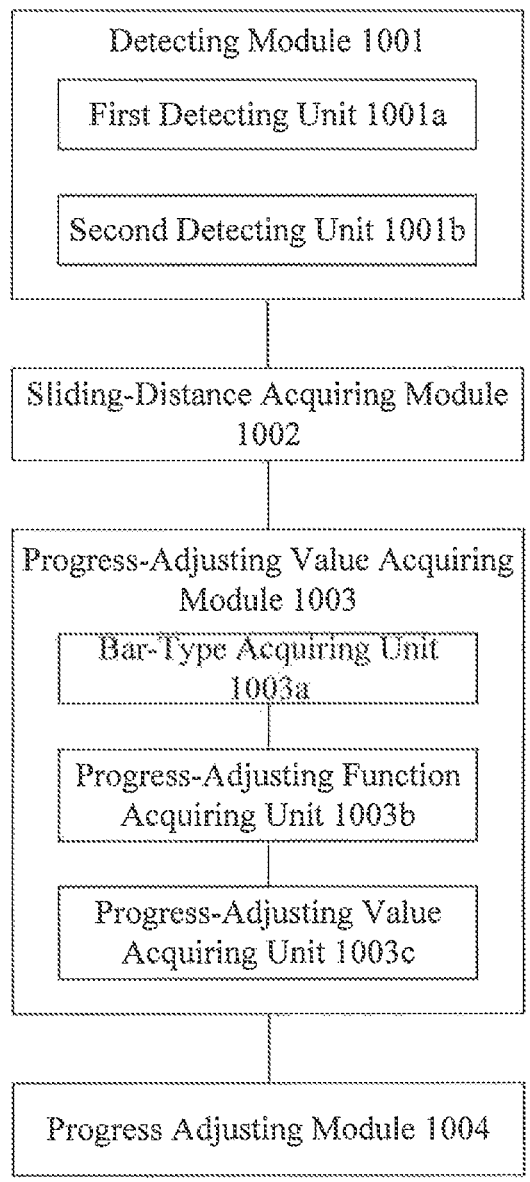
FIG. 11 is a block diagram of a device for progress control, according to an exemplary embodiment.

FIG. 1 is a block diagram of a device 1000 for progress control via a multilevel progress bar, according to an exemplary embodiment. Referring to FIG. 11, the device 1000 includes the detecting module 1001, the sliding-distance acquiring module 1002, the progress-adjusting value acquiring module 1003, and the progress adjusting module 1004 (FIG. 10). As shown in FIG. 11, the detecting module 1001 further includes a first detecting unit 1001a and a second detecting unit 1001b.

The first detecting unit 1001a is configured to detect a trigger signal generated from a progress slider of any level of the progress bars.

The second detecting unit 1001b is configured to detect the trigger signal generated from a point on any level of the progress bars.

Referring to FIG. 11, the progress-adjusting value acquiring module 1003 includes a bar-type acquiring unit 1003a, a progress-adjusting function acquiring unit 1003b, and a progress-adjusting value acquiring unit 1003c.

The bar-type acquiring unit 1003a is configured to determine a type of the multilevel progress bar.

The progress-adjusting function acquiring unit 1003b is configured to acquire the progress-adjusting function of each level of progress bar according to the type of the multilevel progress bar.

The progress-adjusting value acquiring unit 1003c is configured to calculate a progress-adjusting value according to the progress-adjusting function of the triggered progress bar and the sliding distance of the progress slider.

Figure 12:
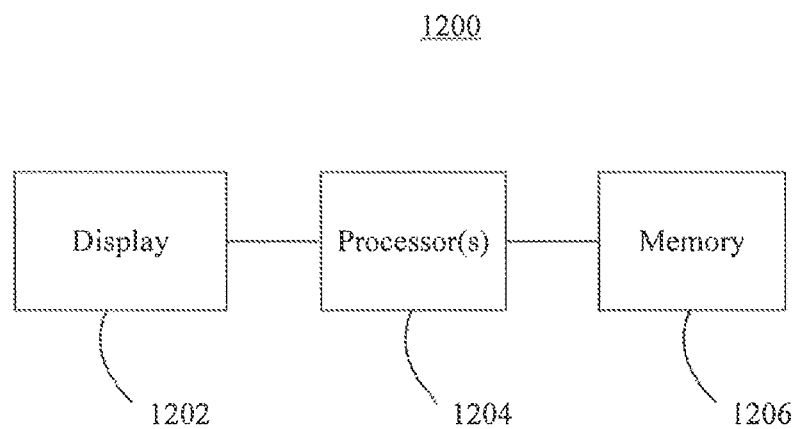
FIG. 12 is a block diagram of a terminal device, according to an exemplary embodiment.

FIG. 12 is a block diagram of a terminal device 1200, according to an exemplary embodiment. Referring to FIG. 12, the terminal device 1200 includes a display 1202, one or more processors 1204, and a memory 1206 configured to store programs and modules executable by the one or more processors 1204. The one or more processors 1204 may be configured to perform various functions and data processing by operating programs and modules stored in the memory 1206. For example, the one or more processors 1204 may be configured to execute instructions so as to perform all or a part of the steps in the above described methods.

In exemplary embodiments, there is further provided a non-transitory computer-readable storage medium including instructions, such as included in the memory 1206, executable by the one or more processors 1204 in the terminal device 1200, to perform the above-described methods. For example, the non-transitory computer-readable storage medium may be a read-only memory (ROM), a random access memory (RAM), a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be understood that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for use in a terminal device, comprising:
   detecting a trigger signal generated from a multilevel circular progress bar, wherein the multilevel circular progress bar includes at least a first progress bar with a first progress slider configured to adjust a progress of the first progress bar, and a second progress bar with a second progress slider configured to adjust a progress of the second progress bar, the first progress bar corresponding to an outer ring of the multilevel circular progress bar, and the second progress bar corresponding to an inner ring of the multilevel circular progress bar;
   when the trigger signal is detected from the first progress bar, calculating a first sliding distance of the first progress slider according to a sliding trajectory indicated in the trigger signal;
   calculating a progress-adjusting value according to the first sliding distance and a first progress-adjusting function of the first progress bar, wherein the first progress-adjusting function represents a relation between the first sliding distance and the progress-adjusting value;
   calculating a second sliding distance of the second progress slider of the second progress bar according to the calculated progress-adjusting value and a second progress-adjusting function of the second progress bar, wherein the second progress-adjusting function represents a relation between the second sliding distance and the progress-adjusting value; and
   controlling sliding of the progress slider of the second progress bar according to the second sliding distance.

2. The method according to claim 1, wherein the detecting of the trigger signal comprises at least one of:
   detecting the trigger signal generated from one of the first progress slider or the second progress slider; or
   detecting the trigger signal generated from a point on the first progress bar or the second progress bar.

3. The method according to claim 1, wherein the calculating of the progress-adjusting value comprises:
   determining a type of the multilevel circular progress bar; and
   acquiring the first progress-adjusting function of the first progress bar according to the type of the multilevel circular progress bar.

4. The method according to claim 1, wherein the relation between the first sliding distance of the first progress slider and the progress-adjusting value is linear.

5. The method according to claim 1, wherein a progress adjustment performed by the first progress slider on the first progress bar in the multilevel progress circular bar comprises at least one of a continuous adjustment or a discrete adjustment.

6. A method for controlling a progress of an application, comprising:
   detecting a trigger signal generated from a multilevel circular progress bar, wherein the multilevel circular progress bar includes at least two progress bars, and each of the at least two progress bars includes at least one progress slider configured to adjust a progress of the corresponding progress bar, the at least two progress bars including a first progress bar corresponding to an outer ring of the multilevel circular progress bar and a second progress bar corresponding to an inner ring of the multilevel circular progress bar;
   when the trigger signal is detected from one of the at least two progress bars of the multilevel circular progress bar, calculating a sliding distance of the corresponding progress slider of the one of the at least two progress bars according to a sliding trajectory indicated in the trigger signal;
   calculating a progress-adjusting value according to the sliding distance and a progress-adjusting function of the one of the at least two progress bars, wherein the progress-adjusting function represents a relation between the sliding distance and the progress-adjusting value; and
   controlling the progress of the application according to the progress-adjusting value.

7. The method according to claim 6, wherein the detecting of the trigger signal comprises:
   detecting the trigger signal generated from a corresponding progress slider of one of the at least two the progress bars; or
   detecting the trigger signal generated from a point on one of the at least two the progress bars.

8. The method according to claim 6, wherein the calculating of the progress-adjusting value comprises:
   determining a type of the multilevel circular progress bar; and
   acquiring a progress-adjusting function of the one of the at least two progress bars according to the type of the multilevel circular progress bar.

9. The method according to claim 6, wherein the relation between the sliding distance and the progress-adjusting value is linear.

10. The method according to claim 6, wherein a progress adjustment performed by the at least one progress slider on a corresponding progress bar in the multilevel circular progress bar comprises a continuous adjustment or a discrete adjustment.

11. A device, comprising:
a processor; and
a memory for storing instructions executable by the processor;
wherein the processor is configured to perform:
detecting a trigger signal generated from a multilevel circular progress bar, wherein the multilevel circular progress bar includes at least a first progress bar with a first progress slider configured to adjust a progress of the first progress bar, and a second progress bar with a second progress slider configured to adjust a progress of the second progress bar, the first progress bar corresponding to an outer ring of the multilevel circular progress bar, and the second progress bar corresponding to an inner ring of the multilevel circular progress bar;
when the trigger signal is detected from the first progress bar, calculating a first sliding distance of the first progress slider according to a sliding trajectory indicated in the trigger signal;
calculating a progress-adjusting value according to the first sliding distance and a first progress-adjusting function of the first progress bar, wherein the first progress-adjusting function represents a relation between the first sliding distance and the progress-adjusting value;
calculating a second sliding distance of the second progress slider of the second progress bar according to the calculated progress-adjusting value and a second progress-adjusting function of the second progress bar, wherein the second progress-adjusting function represents a relation between the second sliding distance and the progress-adjusting value; and
controlling sliding of the progress slider of the second progress bar according to the second sliding distance.

12. The device according to claim 11, wherein the processor is further configured to perform at least one of:
detecting the trigger signal generated from one of the first progress slider or the second progress slider; or
detecting the trigger signal generated from a point on the first progress bar or the second progress bar.

13. The device according to claim 11, wherein the processor is further configured to perform:
determining a type of the multilevel circular progress bar; and
acquiring the first progress-adjusting function of the first progress bar according to the type of the multilevel circular progress bar.

14. The device according to claim 11, wherein the relation between the first sliding distance of the first progress slider and the progress-adjusting value is linear.

15. The device according to claim 11, wherein a progress adjustment performed by the first progress slider on the first progress bar in the multilevel progress circular bar comprises at least one of a continuous adjustment or a discrete adjustment.

16. A device, comprising:
a processor; and
a memory for storing instructions executable by the processor;
wherein the processor is configured to perform:
detecting a trigger signal generated from a multilevel circular progress bar, wherein the multilevel circular progress bar includes at least two progress bars, and each of the at least two progress bars includes at least one progress slider configured to adjust a progress of the corresponding progress bar, the at least two progress bars including a first progress bar corresponding to an outer ring of the multilevel circular progress bar and a second progress bar corresponding to an inner ring of the multilevel circular progress bar;
when the trigger signal is detected from one of the at least two progress bars of the multilevel circular progress bar, calculating a sliding distance of the at least one progress slider of the one of the at least two progress bar according to a sliding trajectory indicated in the trigger signal;
calculating a progress-adjusting value according to the sliding distance and a progress-adjusting function of the one of the at least two progress bars, wherein the progress-adjusting function represents a relation between the sliding distance and the progress-adjusting value; and
controlling a progress of an application according to the progress-adjusting value.

17. The device according to claim 16, wherein the processor is further configured to perform at least one of:
detecting the trigger signal generated from a corresponding progress slider of one of the at least two progress bars; or
detecting the trigger signal generated from a point on one of the at least two progress bars.

18. The device according to claim 16, wherein the processor is further configured to perform:
determining a type of the multilevel circular progress bar; and
acquiring a progress-adjusting function of the one of the at least two progress bars according to the type of the multilevel circular progress bar.

19. The device according to claim 16, wherein the relation between the sliding distance and the progress-adjusting value is linear.

20. The device according to claim 16, wherein a progress adjustment performed by the at least one progress slider on a corresponding progress bar in the multilevel circular progress bar comprises at least one of a continuous adjustment or a discrete adjustment.

* * * * *

UNITED STATES PATENT AND TRADEMARK OFFICE
CERTIFICATE OF CORRECTION

PATENT NO. : 9,927,946 B2
APPLICATION NO. : 14/755175
DATED : March 27, 2018
INVENTOR(S) : Qiuping Qin It is certified that error appears in the above-identified patent and that said Letters Patent is hereby corrected as shown below:

In the Claims

In Claim 5, Column 14, Line 24, "multilevel progress circular bar" should read --multilevel circular progress bar--.

In Claim 7, Column 14, Lines 57-58, "at least two the progress bars;" should read --at least two progress bars;--.

In Claim 7, Column 14, Line 60, "at least two the progress bars." should read --at least two progress bars.--.

In Claim 15, Column 16, Line 1, "multilevel progress circular bar" should read --multilevel circular progress bar--.

In Claim 16, Column 16, Lines 23-24, "at least two progress bar" should read --at least two progress bars--.

Signed and Sealed this
Fifth Day of June, 2018

Andrei Iancu
*Director of the United States Patent and Trademark Office*